United States Patent Office 3,095,385
Patented June 25, 1963

3,095,385
POLYETHERS CONTAINING N-METHYLOL GROUPS
Kuno Wagner, Leverkusen, Germany, assignor, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 26, 1957, Ser. No. 698,939
Claims priority, application Germany Nov. 30, 1956
4 Claims. (Cl. 260—2)

This invention relates generally to polyethers containing N-methylol groups and, more particularly, to a novel method for making polyethers containing relatively large numbers of N-methylol groups.

It has been proposed heretofore to prepare ethers by condensation of a monofunctional or polyfunctional N-methylol compound with a monohydroxy alcohol. The monofunctional alcohol must be used in an excess over that theoretically required in order to insure uniform and ordinary condensation. It has also been proposed to condense polyhydroxy alcohols with N,N'-dimethylol compounds but various reactions other than the condensation occur and the resulting product consequently has a nonuniform structure. A method is provided by the invention described and claimed in copending application Serial No. 680,407, filed August 26, 1957, now Patent No. 2,976,261, by Kuno Wagner and Erwin Müller, for condensing N-polymethylol compounds with a polyhydroxy alcohol containing at least one oxygen or sulfur ether atom connected to a carbon chain having more than two carbon atoms. That process provides a method for making a polyether having a reproducible structure with a predetermined number of N-methylol or alcoholic hydroxyl terminal groups.

It is possible to prepare polyethers having a relatively large number of N-methylol groups by condensing a polyhydric alcohol and a poly-N-methylol compound in the presence of an acid and preferably in the presence of only a small amount of the acid. In such a process, however, it is necessary to use trimethylol or tetramethylol compounds of urea to prepare such polycondensation products having a urea base in order to avoid the presence of a large number of reactive NH groups. The NH groups are objectionable because they provide a means for cross-linking of the molecules with methylene ether groups. In an alternate method, a dimethylol compound of a urea may be used but formaldehyde must be included in the reaction mixture to avoid undesirable cross-linking reactions by way of methylene ether groups. The condensation products obtained are soluble in water if a water-soluble polyalcohol is condensed with the poly-N-methylol urea and the viscosity of the condensation product is within the range of from about 3 to about 22,000 cp./75°.

The viscosity of the products is determined by the well known method described in Höppler, Zeitschrift für technische Physik, vol. 14, 1933, page 165.

It is often desirable to modify the polycondensation products of relatively high molecular weight obtained by one of the heretofore described condensation processes in order to provide a high molecular weight compound having a greater number of N-methylol groups. This may be done by reacting the condensation product with a poly-N-methylol compound in the presence of an acid but cross-linking occurs and an undesirable gelatinous product is obtained. If on the other hand, an excess of a low molecular weight reactant, such as, for example, a monofunctional or bifunctional alcohol, is used in the condensation, alcoholysis will occur and a degraded product will be obtained.

It is therefore an object of this invention to provide a method for making polyethers containing N-methylol groups in relatively large numbers without any substantial amount of undesirable cross-linking during the condensation process. Another object of the invention is to provide an improved method for making polyethers of relatively high molecular weight containing N-methylol groups which are stable and are not undesirably cross-linked. Still another object of the invention is to provide a polyether having terminal hydroxyl groups and containing N-methylol groups in a relatively large quantity without undesirable cross-linking.

In accordance with this invention, generally speaking, the foregoing objects as well as others are accomplished by providing a process wherein a polyether having terminal hydroxyl groups and containing N-methylol groups is condensed with an N-polymethylol compound in the presence of an alkaline compound. It has been found that a substantially linear or branched N-methylol polyether having methylol groups with unreacted hydroxyl groups can be reacted with a compound containing N-methylol groups to provide a polyether of greater molecular weight and containing more N-methylol groups without degradation of the original polyether and without undesirable cross-linking occurring during the condensation provided the condensation between the two compounds is conducted under alkaline conditions. It is believed that the modification resulting from the process provided by this invention is largely effected through methylene ether linkages between the two reactants.

Any suitable basic catalyst may be included in the mixture to be condensed in accordance with this invention. The catalyst may be either an inorganic or an organic base, preferably a neutral one, i.e., an organic base which will not enter into the condensation reaction.

Examples of suitable inorganic bases are sodium hydroxide, potassium hydroxide, lithium hydroxide, calcium oxide, calcium hydroxide, barium oxide, and barium hydroxide. Organic bases which are suitable as catalysts are for instance: tetramethyl ethylene diamine, pentaethyl diethylene triamine, hexamethyl triethylene tetramine, hexahydrodimethyl aniline, dimethyl aniline, dimethylbenzyl amine, and pyridine. Any amount of catalysts has some influence on the reaction and is contemplated by the invention. Preferably, however, at least about 0.1 percent by weight catalyst is used. Usually not more than about 2 percent of the reaction mixture will be catalyst.

The products obtained by practicing the process of this invention are soluble in water and alcohols even though the poly-N-methylol compound condensed with the polyether is of relatively low molecular weight and of comparatively low solubility in water or the alcohol. The product provided by this invention is very reactive chemically and contains a large number of methylol groups. Preferably, the polyether used to condense with the poly-N-methylol compound of this invention has a molecular weight of at least about 700 before the condensation and the product provided by this invention has a greater molecular weight. The polyether used in the condensation process may have a methylol content of as little as about 2 percent by weight before the condensation with the poly-N-methylol compound and may contain any larger quantity of methylol groups and preferably as much as about 18 percent or more groups after the condensation. The most preferred range is from about 3 percent to about 8 percent by weight methylol groups in the starting compound and from about 4 percent to about 10 percent by weight methylol groups in the condensation product.

The reaction between the poly-N-methylol compound and the N-methylol polyether provided by this invention may be conducted in some instances without the addition of a solvent. However, it is preferred to carry out the reaction while the two components are dissolved in water or other suitable solvent, such as, for example, an alcohol. Many of the N-methylol polyethers are not sufficiently good solvents for the poly-N-methylol compounds to insure complete dissolution of the latter compound and complete miscibility thereof, so it is preferred to use water or one of the polyalcohols or mixtures thereof as a solvent. Any suitable alcohol may be used, such as, for example, hexanetriol or the like.

Any suitable monomeric poly-N-methylol compound may be used to condense with the N-methylol polyether. Examples of such poly-N-methylol compounds include hexamethylol melamine, tetramethylol acetylene urea, tetramethylol dimethyl acetylene urea, tetramethylol hydrazocarbonamide, polymethylol compounds of adipic acid dihydrazide, polymethylol compounds of adipic acid diamide, polymethylol compounds of unsubstituted diurethanes or the like.

Any suitable polyether containing N-methylol groups and having the required molecular weight may be used and is contemplated by this invention. For example, polyethers prepared by condensation of any poly-N-methylol compound with a polyfunctional alcohol may be used. More specifically, the polyethers contemplated by this invention for condensation with a poly-N-methylol compound under alkaline conditions may be a polyether having a high methylol content prepared from a dimethylol compound, a trimethylol compound or tetramethylol compound of urea or thiourea and any suitable polyfunctional alcohol, such as, for example, glycerine, butanetriol, hexanetriol, a mixture of glycerine and hexanetriol, a mixture of glycerine and butanetriol, a mixture of butanetriol and pentaerythritol, pentaerythritol, polyethylene glycols, such as, for example, diethyleneglycol in admixture with trifunctional alcohols, such as glycerine, any hydroxy ethylated aliphatic alcohol, or the like. N-methylol polyethers prepared from a polymethylol diurea, such as, for example, hexamethylene diurea or polyethers prepared from a poly-N-methylol compound of a dicarboxylic acid diamide, or polyethers prepared from a substituted diurethane, such as for example tetramethylol diurethane, or polyethers prepared from tetramethylol compounds of hydrazo carbonamide, may also be used. The process provided by this invention may also be used to condense a poly-N-methylol compound with a polyether prepared from a polyalcohol and tetramethylol acetylene urea or tetramethylol diacetylene urea.

In practicing the invention, the N-methylol polyether may be dissolved in a small quantity of water and the resulting solution may then be mixed with small quantities of alcohol and hexanetriol in an amount equivalent to the amount of water. This mixture is then mixed with a suitable poly-N-methylol compound while the temperature of the mixture is about 90° C. This mixture is then heated until condensation. The pH of the reaction mixture falls slowly as condensation proceeds because of the formation of formic acid. If desired, the pH can be maintained near the pH of the starting mixture by additions of bases during the condensation. If the pH is allowed to fall within a few hours from 6.5 to 6.2, the resulting product will be soluble in water and alcohol, but an undesired side reaction is taking place involving alcoholic hydroxyl groups and N-methylol groups. Thus, the pH should be maintained above 6.2. Any catalyst which will maintain the pH above 6.2 and not enter into the condensation may be used. If hexamethylol melamine is used as a poly-N-methylol component in the condensation, it is advisable to dissolve it in water heated to the boiling point and to add the resulting boiling solution to the polyether component.

The polyethers containing N-polymethylol groups provided by this invention have excellent stability and may be stored for long periods of time before they are used. Compounds provided by this invention may be used to advantage as a fixing agent for fixing pigments on textiles to render them resistant to washing and aging. The polyethers provided by this invention may also be used for preparing a polyurethane by reaction with an organic polyisocyanate. The resulting polyurethane may be used as a sponge or insulation or as a backing material, or it may be utilized for making machine parts, shoe soles, vehicle tires and the like.

*Example 1*

A freshly prepared suspension of about 306 parts by weight of hexamethylol melamine in about 292 parts by weight of water, or the boiling hot and still alkaline reacting solution of the freshly prepared hexamethylol melamine, is added to a solution heated to about 90° to about 95° C. and consisting of about 430 parts by weight of a trimethylol urea-hexanetriol-butanedihydroxyethyl glycol polyether having a methylol group content of about 4.5 percent by weight and a melt viscosity of about 10,200 cp. (at about 75° C.) in about 172 parts by weight of water, and about 30 parts by volume of 1 N-NaOH are added to the reaction mixture. About 400 parts by weight of technical hexanetriol are added while stirring thoroughly; the clear solution is heated for about 2 to about 3 hours at an internal temperature of about 90° C. to about 100° C. The pH value slowly drops from about 7 to about 6.5 owing to the formation of formic acid in small quantities. The clear solution obtained can be diluted in any proportion with water. Even with a condensation period of about 8 hours at about 100° C., neither cross-linked products nor sparingly soluble condensation products of hexamethylol melamine are formed. The product contains about 7.2 percent by weight methylol groups.

*Example 2*

The procedure adopted is in accordance with Example 1, but using about 582 parts by weight of a N-methylol polyether of trimethylol urea and hydroxy ethylated trimethylol propane having a methylol content of about 6.7 percent and a melt viscosity of about 4000 cp. (at about 75° C.). About 400 parts by weight of hexanetriol, about 25 parts by volume of 1 N-NaOH and the freshly prepared and still alkaline reacting solution of about 306 parts by weight of hexamethylol melamine in about 300 parts by volume of water are added to the melt, while it is at a temperature of about 90° C. Condensation takes place as in Example 1 until the pH value of the reaction mixture has fallen to about 6.4. A clear solution of the modified polyether with excellent storage capacity is obtained. The product has a methylol group content of about 8.6 percent by weight.

*Example 3*

In a manner analogous to the working method of Example 1, there is employed as the N-methylol polyether component containing methylol groups:

(a) A concentrated solution of about 500 parts by weight of a highly branched N-methylol polyether from trimethylol urea and hexanetriol having a methylol group content of about 3.5 percent and a melt viscosity about 17,500 cp. at about 75° C. in about 224 parts by weight of water.

(b) A hot solution of about 524 parts by weight of a trimethylol urea-hexanetriol-pentaerythritol polyether mixture having a methylol group content of about 5.6 percent by weight in about 224 parts by weight of water.

(c) A hot solution of a tetramethylol urea-glycerine-triethylene glycol-hexanetriol polyether having a methylol group content of about 5.2 percent and a melt viscosity about 20,000 cp. at about 75° in about 200 parts by volume of water, or (d) A hot solution of about 510 parts by weight of a trimethylol urea-butanetriol polyether having a methylol content of about 5.2 percent and a melt viscosity of about 6800 cp. at about 75° in about 190 parts by volume of water.

After adding about 25 parts to about 35 parts by volume of 1 N-NaOH, the reaction mixture is kept for about 4 hours to about 6 hours at about 95° C. Stable solutions of the modified N-methylol polyether are obtained in each case, these solutions being miscible in all proportions with water.

Product obtained from process of (a) has a methylol group content of about 6.2 percent. Products obtained from processes of (b), (c), and (d) are within range of from about 5.8 percent to about 8.2 percent.

*Example 4*

About 200 parts by weight of a trimethylol ureahexanetriol-butanedihydroxyethyl glycol polyether with a methylol group content of about 4.5 percent by weight and a melt viscosity of about 10,200 cp. at about 75° C. are mixed in accordance with the procedure of Example 1:

(a) With about 200 parts by weight of hexanetriol and a solution of about 177 parts by weight of hexamethylol adipic acid dihydrazide in about 150 parts by volume of water, or (b) With about 200 parts by weight of hexanetriol and a solution of about 148 parts by weight of tetramethyloltetramethylene diurethane, or (c) With about 200 parts by weight of hexanetriol and about 102 parts by weight of polymethylol dicyandiamide in about 150 parts by volume of water, or (d) With about 200 parts by weight of hexanetriol and a solution of about 191 parts by weight of polymethylol hexamethylene diurea in about 150 parts by volume of water, or (e) With about 200 grams of hexanetriol and a solution of about 112 parts by weight of tetramethylol adipic acid diamine in about 190 parts by volume of water, or (f) With about 200 grams of hexanetriol and a solution of about 135 parts by weight of tetramethylol acetylene urea in about 80 parts by volume of water, or (g) With about 200 parts by weight of hexanetriol and a solution of about 146 parts by weight of tetramethylol dimethyl acetylene urea in about 80 parts by volume of water.

In each case, the condensation is effected at about 95° C. and about 20 parts to about 30 parts by volume of 1 N-NaOH are added. After a condensation period of about 4 hours to about 6 hours, stable solutions which are miscible with water in all proportions are obtained. Product obtained in each case is from about 5.8 percent to about 8.2 percent by weight.

It is to be understood that any other suitable poly-N-methylol compound and any other suitable polyether having methylol groups may be substituted for each of those in the foregoing examples. It is also to be understood that any other suitable alkaline compound of the class described herein may be substituted for the catalyst specified in the above examples. Any of the various other components listed herein may be substituted in these examples and a desirable product will be obtained.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method of making a water soluble polyether having a relatively large number of N-methylol groups and a molecular weight of at least about 700 without undesirable cross-linking which comprises further reacting a water soluble polyether having about 2 to about 8 percent by weight of methylol groups and terminal hydroxyl groups which was prepared by a process which comprises reacting a member selected from the group consisting of dimethylol, trimethylol and tetramethylol substituted ureas and thioureas with a different polyhydric alcohol, with a monomeric poly-N-methylol compound at a pH of at least about 6.2 and a temperature of at least about 90° C. in a member selected from the group consisting of water and alcohol solvents for the reaction mixture until a polyether having more N-methylol groups than the initial water-soluble polyether is obtained.

2. The product of the method of claim 1.

3. The method of claim 1 wherein the final polyether product has from about 4 to about 10 percent by weight of N-methylol groups.

4. The method of claim 1 wherein said monomeric poly-N-methylol compound is selected from the group consisting of hexamethylol melamine, tetramethylol acetylene urea, tetramethylol dimethyl acetylene urea, tetramethylol hydrazocarbonamide, polymethylol compounds of adipic acid diamide and polymethylol compounds of unsubstituted diurethanes.

References Cited in the file of this patent

UNITED STATES PATENTS

| | | |
|---|---|---|
| 2,339,768 | D'Alelio | Jan. 25, 1944 |
| 2,339,769 | D'Alelio | Jan. 25, 1944 |
| 2,385,320 | Greene et al. | Sept. 18, 1945 |
| 2,407,376 | Maxwell | Sept. 10, 1946 |
| 2,447,621 | Smidth | Aug. 24, 1948 |
| 2,485,187 | Cadot | Oct. 18, 1949 |
| 2,535,380 | Adams et al. | Dec. 26, 1950 |
| 2,577,767 | Jones | Dec. 11, 1951 |
| 2,802,752 | Wood | Aug. 13, 1957 |
| 2,976,261 | Wagner et al. | Mar. 21, 1961 |